US010158658B1

(12) United States Patent
Sharifi Mehr

(10) Patent No.: US 10,158,658 B1
(45) Date of Patent: Dec. 18, 2018

(54) SYSTEM FOR DETERMINING NETWORK ANOMALIES

(71) Applicant: AMAZON TECHNOLOGIES, INC., Seattle, WA (US)

(72) Inventor: Nima Sharifi Mehr, Vancouver (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 50 days.

(21) Appl. No.: 14/960,013

(22) Filed: Dec. 4, 2015

(51) Int. Cl.
*H04L 29/06* (2006.01)

(52) U.S. Cl.
CPC ...... *H04L 63/1425* (2013.01); *H04L 63/1416* (2013.01); *H04L 63/205* (2013.01)

(58) Field of Classification Search
CPC .................. H04L 63/205; H04L 63/1416; H04L 63/1425
See application file for complete search history.

(56) References Cited

U.S. PATENT DOCUMENTS

| | | | | |
|---|---|---|---|---|
| 7,376,969 B1* | 5/2008 | Njemanze | ............... | G06F 21/55 709/224 |
| 8,230,505 B1* | 7/2012 | Ahrens | ................. | G06Q 10/02 705/5 |
| 9,807,092 B1* | 10/2017 | Gutzmann | .......... | H04L 63/1458 |
| 9,888,023 B2* | 2/2018 | Nantel | ................ | H04L 63/1425 |
| 2003/0149887 A1* | 8/2003 | Yadav | ..................... | G06F 21/55 726/23 |
| 2006/0133377 A1* | 6/2006 | Jain | ..................... | H04L 63/1408 370/392 |
| 2008/0229414 A1* | 9/2008 | Hudis | ..................... | H04L 63/20 726/22 |
| 2010/0281539 A1* | 11/2010 | Burns | ................. | H04L 63/1441 726/23 |

(Continued)

OTHER PUBLICATIONS

Fung et al.; Robust and scalable trust management for collaborative intrusion detection; 2009; Retrieved from the Internet <URL: http://ieeexplore.ieee.org/document/5188784/#full-text-section>; pp. 1-8 as printed.*

(Continued)

*Primary Examiner* — Saleh Najjar
*Assistant Examiner* — Michael W Chao
(74) *Attorney, Agent, or Firm* — Lindauer Law, PLLC

(57) ABSTRACT

Described are techniques for determining abnormalities in the transmission of data using one or more networks. Responsive to a request or other data, multiple anomaly detection services may determine anomaly values indicative of the likelihood that the request is anomalous. An aggregate value may also be determined based on at least a subset of the anomaly values. Based on correspondence between the aggregate value or any of the anomaly values and threshold data, the request may be determined to be anomalous or non-anomalous. The anomaly values may also be compared to security profile data indicative of sets of values determined based on previous requests. If the current anomaly values do not correspond to the security profile data, this determination may indicate that one or more of the anomaly detection services is compromised. Subsequent values from compromised anomaly detection services may be disregarded until remedied.

20 Claims, 7 Drawing Sheets

(56) References Cited

U.S. PATENT DOCUMENTS

| | | | | |
|---|---|---|---|---|
| 2011/0219450 A1* | 9/2011 | McDougal | ............... | G06F 21/56 726/23 |
| 2017/0041342 A1* | 2/2017 | Efremov | ............. | H04L 67/1008 |
| 2017/0237755 A1* | 8/2017 | Visbal | ................ | H04L 63/1416 726/23 |

OTHER PUBLICATIONS

Valdes et al.; "Probabilistic Alert Correlation"; 2001; Retrieved from the Internet <URL: https://link.springer.com/chapter/10.1007/3-540-45474-8_4>; pp. 1-15 as printed.*

Ghosh et al.; Agent-Based Distributed Intrusion Alert System; 2004; Retrieved from the Internet <URL: https://link.springer.com/chapter/10.1007%2F978-3-540-30536-1_28>; pp. 1-13, as printed.*

Mutlu et al.; A distributed Cooperative Trust Based Intrusion Detecdtion Framework for MANETs; 2011; Retrieved from the Internet <URL: https://www.researchgate.net/publication/267250391_A_Distributed_Cooperative_Trust_Based_Intrusion_Detection_Framework_for_MANETs>; pp. 1-8 as, printed.*

Bankovic et al.; Improving security in WMNs with reputation systems and self-organizing maps; 2011; Retrieved from the Internet <URL: http://www.sciencedirect.com/science/article/pii/S1084804510000585>; pp. 1-9, as printed.*

* cited by examiner

SYSTEM FOR DETERMINING NETWORK ANOMALIES

BACKGROUND

Services or other types of programs may be used to monitor different levels of a network stack to determine abnormalities, such as potentially malicious attacks or other security issues, in received requests or other data.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
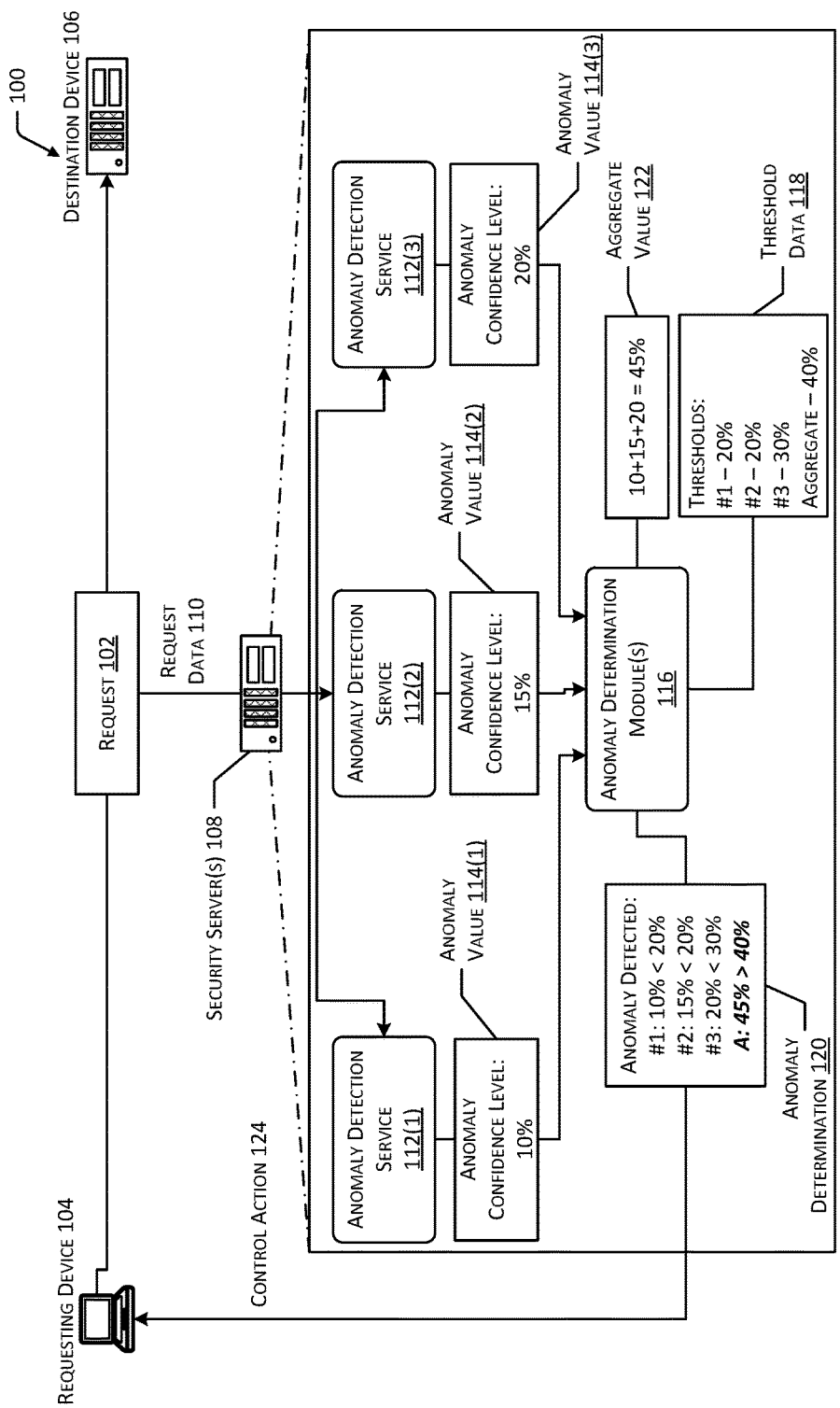
FIG. 1 depicts a system for determining anomalies associated with requests or other received data.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A malicious attack or other types of abnormalities associated with a network may typically include the transmission of anomalous data. For example, a request or other data received over a network may include various packet types, packet sizes or lengths, field types, field values, field sizes, orders or arrangements of fields, extension types, record types, orders or arrangements of records, application versions, and so forth. A request may also be associated with a particular source, such as an internet protocol (IP) address, a geographical region, a particular user, device, or service, and so forth. Requests may additionally be associated with particular communication channels or methods of connection. Characteristics of a request may be observed at multiple levels of a network stack, such as a network layer (e.g., IP), a transport layer (e.g., transmission control protocol (TCP)), a session layer (e.g., secure sockets layer (SSL)), an application layer (e.g., hypertext transfer protocol (HTTP)), and the accessed application itself.

Services, or other types of programs, code, and so forth, may be used to monitor one or more levels of a network stack to detect potentially anomalous data. For example, a particular IP address may be included on a list of potentially malicious IP addresses or a request may be received from an unknown IP address. A TCP, SSL, or transport layer security (TLS) communication may include extra or missing fields, extensions, and so forth. A HTTP communication may include erroneous or unexpected header information. A communication at the application level may fail to match regular expressions or data types. Upon receiving a request, an anomaly detection service may generate a value indicating the confidence that the request may be anomalous. Values in excess of a certain threshold may be used to trigger user intervention or another control action. However, many malicious attacks or other abnormalities may evade detection if no particular service generates a value sufficient to trigger a control action. Additionally, malicious attacks may target the anomaly detection services, themselves, causing the generation of values that lead to false positive or false negative results.

Described in this disclosure are techniques for detecting anomalies in a network that may be missed by individual anomaly detection services and techniques for determining and reducing the impact of potentially compromised or erroneous anomaly detection services. One or more anomaly detection services may determine request data associated with a received request. The request data may include one or more values associated with the request, such as packet sizes or types, field values, sizes, or orders, record types or values, header information, and so forth. In some implementations, the request data may include values determined from multiple levels of a network stack. In further implementations, the request data may include metadata, such as a source or type associated with the request. For example, the request data may include a geographic region or an IP address from which the request originated. The values determined by the anomaly detection services may include a confidence level, score, or other type of indication associated with the likelihood that at least a portion of the request data is anomalous. For example, a large value may indicate a high likelihood that a request is malicious or otherwise abnormal, while a small value may indicate a low likelihood. Continuing the example, an anomaly detection service may determine correspondence between a particular value of the request data and a corresponding threshold value for that anomaly detection service. The threshold value may indicate that a typical request is expected to include packets of a particular size that include particular header information. If an anomaly detection service determines that a received packet associated with the request differs from this threshold value by more than a threshold degree, the determined value may be large, indicating a high likelihood of an anomaly. If the received packet does not differ from the threshold value or differs by less than a threshold degree, the determined value may be very small, or zero, indicating a low likelihood of an anomaly.

If one or more of the anomaly detection services indicates a high likelihood of an anomaly, a control action may be undertaken responsive to the request. However, in some cases, a request may be anomalous, but the request data may not include values that deviate significantly from the individual threshold values for the anomaly detection services. For example, one or more of the anomaly detection services may determine non-zero value(s) associated with the request. However, these values may be insufficient to trigger a control action. To increase the likelihood of detecting anomalous requests, an aggregate value may be determined, based on at least a subset of the values determined by the anomaly detection services. For example, the aggregate value may include the sum of the values determined by each anomaly detection service. In other implementations, the values from particular anomaly detection services may be weighted differently than those determined from other services. In still other implementations, the values from some of the anomaly detection services may be disregarded. Correspondence between the aggregate value and a threshold value may then be used to cause performance of a control action associated with the request. In some implementations, the extent to which the aggregate value fails to correspond to the expected threshold value may determine the particular control action that is performed with regard to the request.

As an example, five anomaly detection services, each associated with a different level of a network stack, may each be configured to trigger a control action if a value greater than 25 is determined. A malicious request, however, may be designed to avoid detection by causing generation of values less than 25. For example, IP fragmentation may be used to manipulate the IP datagram and the size of the packets in the request. Continuing the example, the request may cause each anomaly detection service to generate a value of 10, which would not cause any of the individual anomaly detection services to trigger a control action. However, the system may be configured to perform a control action if an aggregate value, based on the individual values determined by each service, equals or exceeds 45. In this example, the aggregate value may be the sum of each of the individual detected values: 50. Due to the aggregate value exceeding 45, a control action may be performed with regard to the request. A malicious request or other abnormality that otherwise may have avoided detection by any of the anomaly detection services, individually, may thereby be detected and addressed.

In some implementations, if an anomalous request is determined, the combination of values determined by the anomaly detection services may be stored as anomaly data. If a subsequent request is received for which the same combination of values is determined, or a combination of values within a threshold tolerance of the anomaly data, this request may be determined to be anomalous independent of the values determined by the anomaly detection services or the aggregate value.

In some cases, a malicious attack or another type of error or abnormality may affect one or more of the anomaly detection services, which may prevent the detection of abnormalities by affecting the aggregate value, as well as the individual value(s) determined by the affected service(s). To determine whether one or more anomaly detection services may be generating erroneous values, security profile data may be accessed. The security profile data may include one or more sets of values from multiple anomaly detection services that typically occur when a request or other data having particular characteristics is received. In some implementations, the security profile data may be generated using historical data that associates characteristics of a request or other received data with the values generated by one or more anomaly detection services. For example, upon receipt of a request having unfamiliar packet lengths and HTTP header information, a first service may generate a value of 50 and a second service may generate a value of 70. Each time that a request having identical or similar characteristics is received, the first and second services may be expected to generate the same or similar values. The security profile data may include any quantity of sets of values for various anomaly detection services that are typically received together, e.g., responsive to the same or similar received data.

When a subsequent request or other subsequent data is received, correspondence between the security profile data and the received request may be determined. If the values determined by the anomaly detection services for the request match or are within a threshold tolerance of an existing set of values in the security profile data, this correspondence may indicate that the anomaly detection services are functioning normally. If the values determined by the anomaly detection services differ from the sets of values in the security profile data, this mismatch may indicate that one or more of the anomaly detection services that processed the request generated an inaccurate value. The particular values generated by the anomaly detection services that differ from the sets of values in the security profile data may be determined, and a control action make be performed with regard to the service(s) that correspond to the value(s). For example, values determined by the affected anomaly detection service(s) may be disregarded until proper functioning of the service(s) has been confirmed by a user. As another example, the control action may include modifying the inputs processed by an anomaly detection service. In some implementations, the values generated by the anomaly detection services that differ from security profile data may be identified by determining one or more particular values generated by the anomaly detection services that, when disregarded, cause the remaining values to correspond to the security profile data. In other implementations, a potentially erroneous anomaly detection service may be identified by determining a lack of correspondence between multiple values generated by the service and multiple corresponding sets of the security profile data. In some implementations, the particular control action that is undertaken may depend upon the extent to which a value determined by an anomaly detection service deviates from the security profile data. For example, if the determined value deviates significantly from the security profile data, subsequent values determined by the anomaly detection service may be wholly disregarded. If the determined value deviates slightly from the security profile, the weight of subsequent values determined by the anomaly detection service may be reduced slightly. In other implementations, the particular control action that is undertaken may depend upon the particular anomaly detection service with which the control action is associated. For example, values determined by certain anomaly detection services may be disregarded, while other anomaly detection services may be modified to access different portions of a request.

Implementations within the present disclosure may thereby enable anomalous data in a network to be detected by using aggregate values based on multiple anomaly detection services. In cases where data generated by one or more anomaly detection services may, itself, be anomalous, implementations within the present disclosure may determine the presence of an anomaly in the anomaly detection services and reduce or eliminate the effect of the anomaly on subsequent attempts to detect anomalous data.

FIG. 1 depicts a system 100 for determining anomalies associated with requests 102 or other received data. For example, a requesting device 104 may provide a request 102 to a destination device 106 to access one or more resources associated with the destination device 106. Resources may include records, services, applications, and so forth. In other implementations, the requesting device 104 may provide other types of data to the destination device 106, such as communications, records, or resources. The destination device 106 may, in turn, provide responses, other requests 102, or other data to the requesting device 104. The request 102 may be provided over one or more networks, which may include local area networks (LANs), wireless LANs (WLANs), wide area networks (WANs), wireless WANs, and so forth. The request 102 may therefore include various characteristics associated with one or more levels of a network stack associated with the network(s). For example, the request 102 may include a particular packet length and arrangement, a particular HTTP header, particular TCP or SSL fields or extensions, and so forth.

In some cases, a request 102 may be associated with a malicious attack on the destination device 106 or other associated networks or devices. In other cases, the request 102 may include one or more other anomalies, abnormalities, errors, and so forth that may negatively affect the destination device 106 or other associated networks or devices. One or more security servers 108 may communicate with one or more of the requesting device 104 or the destination device 106 (e.g., via the one or more networks) to determine request data 110 associated with the request 102 for the purpose of detecting anomalous data. While FIG. 1 depicts a single security server 108, the security server 108 may include any number and any type of computing devices, such as mobile devices, set-top boxes, tablet computers, personal computers, wearable computers, servers, and so forth. For example, multiple computing devices may be used to determine different characteristics of a request 102, such as by monitoring different layers of a network stack, such that the functionality of the security server 108 is distributed across a network of computing devices. The requesting device 104 and the destination device 106 may also include any number or any type of computing devices including, without limitation, the types of computing devices described with regard to the security server 108. In some implementations, the functions of the security server 108 may instead be performed by one or more services executing on one or more of the requesting device 104, the destination device 106, or one or more other computing devices in communication therewith.

The request data 110 determined by the security server 108 may include data indicative of one or more characteristics of the request 102. For example, the request data 110 may indicate a source associated with the request 102. Continuing the example, the source of the request 102 may include an IP address, media access control (MAC) address, or other identifier or network address associated with the requesting device 104, a location or geographic region associated with the requesting device 104, a user identifier or account identifier associated with the requesting device 104, and so forth. The request data 110 may also include one or more types or categories associated with the request 102. The request data 110 may further include characteristics of the request 102 associated with various levels of a network stack. For example, the request data 110 may include a packet type or length, field types, sizes, or values, extension or record types, versions of applications, header information, and so forth. Continuing the example, the request 102 may include a particular packet length determined at the network layer (e.g., IP), the presence of a particular optional field at the transport layer (e.g., TCP), one or more particular types of extensions at the session layer (e.g., SSL or TLS), particular header information at the application layer (e.g., HTTP), and particular expressions or data types associated with the application itself. The security server 108 may determine request data 110 indicative of one or more of these or other characteristics of the request 102.

In some implementations, the security server 108 may include one or more anomaly detection services 112. The anomaly detection service(s) 112 may be associated with a single computing device or distributed among multiple computing devices. The anomaly detection services 112 may include any manner of program, service, process, application, daemon, or code configured to process at least a portion of the request data 110 as inputs and generate an anomaly value 114 as an output. In some implementations, the anomaly detection services 112 may determine correspondence between at least a portion of the request data 110 and predetermined or user input data indicative of expected characteristics of non-anomalous requests. For example, the destination device 106 may be configured to receive requests 102 having particular HTTP header information or TLS extensions. One or more anomaly detection services 112 may determine whether the HTTP header information or TLS extensions of the request 102 match or fall within a threshold tolerance of the expected characteristics of non-anomalous requests.

The anomaly value 114 may be indicative of a probability, rating, score, or other evaluator associated with the presence of an anomaly in the request 102. For example, if a request 102 having a packet length that is identical to an expected packet length is received, an anomaly detection service 112 may determine an anomaly value 114 of zero. If the packet length of the request 102 is slightly less than the expected packet length, the anomaly value 114 may be a small, non-zero value indicating a slight probability that the request 102 is anomalous. If the packet length of the request 102 deviates significantly from the expected packet length, the anomaly value 114 may be large, indicating a significant probability that the request is anomalous. An anomaly value 114 may be expressed as a percent (e.g., a numeral ranging from 0 to 100), the percent indicating the likelihood that the request 102 is anomalous. As other examples, the anomaly values 114 may include Boolean indicators, scores represented by numeric or alphanumeric data, or graphical indicators. In other implementations, the anomaly values 114 may be machine-readable but may not include data interpretable by a human user.

In some implementations, the security server 108 may include multiple anomaly detection services 112, each service determining an anomaly value 114 based on respective portions of the request data 110. For example, a first anomaly detection service 112(1) may determine a first anomaly value 114(1) based on a first portion of the request data 110, such as data associated with the network layer (e.g., IP) of a network stack. A second anomaly detection service 112(2) may determine a second anomaly value 114(2) based on a second portion of the request data 110, such as data associated with the transport layer (e.g., TCP) of the network stack. A third anomaly detection service 112(3) may determine a third anomaly value 114(3) based on a third portion of the request data 110, such as data associated with the application layer (e.g., HTTP) of the network stack. While FIG. 1 depicts three example anomaly detection services 112 associated with the security server 108, any number of anomaly detection services 112 may be used. For example, a single anomaly detection service 112 may determine one or multiple anomaly values 114 based on request data 110 associated with any number of characteristics of the request 102. As another example, multiple anomaly detection services 112 may determine anomaly values 114 based on characteristics of the request 102 associated with the same layer of the network stack.

An anomaly determination module 116 associated with the security server 108 may determine the presence or absence of anomalies associated with the request 102 based on the anomaly values 114. In some implementations, the anomaly determination module 116 may determine correspondence between one or more of the anomaly values 114 and threshold data 118 that includes corresponding threshold values for at least a subset of the anomaly values 114. For example, the threshold data 118 may associate a particular threshold value for each anomaly detection service 112. Continuing the example, FIG. 1 depicts the threshold data 118 including a threshold value of 20% for the first anomaly detection service 112(1), a threshold value of 20% for the second anomaly detection service 112(2), and a threshold value of 30% for the third anomaly detection service 112(3). Based on the anomaly values 114 determined by the anomaly detection services 112 and the threshold values, the anomaly determination module 116 may generate an anomaly determination 120 indicative of the anomalous or non-anomalous nature of the request 102.

For example, FIG. 1 depicts the first anomaly value 114(1) as 10%, which is less than the corresponding threshold value of 20%. FIG. 1 depicts the second anomaly value 114(2) as 15%, which is less than the corresponding threshold value of 20%. FIG. 1 depicts the third anomaly value 114(3) as 20%, which is less than the corresponding threshold value of 30%. Thus, based solely on the individual anomaly values 114 determined by the individual anomaly detection services 112, the anomaly determination module may determine that the request 102 is non-anomalous. However, in some cases, an anomalous request 102 may be undetectable by individual anomaly detection services 112. For example, a malicious request 102 may include packet characteristics, extensions, header information, and so forth designed to imitate a non-anomalous request 102 and avoid detection by the anomaly detection services 112. Continuing the example, the malicious request 102 may include characteristics that may cause small, non-zero anomaly values 114 to be generated. Individually, the small anomaly values 114 may be less than the corresponding threshold values, such that the anomaly determination module 116 values to detect the anomalous request 102.

To increase the likelihood of detecting anomalous requests 102, the anomaly determination module 116 may determine an aggregate value 122 based on at least a subset of the anomaly values 114. In some implementations, the aggregate value 122 may include a sum of at least a subset of the anomaly values 114. In other implementations, the aggregate value 122 may include one or more average values (e.g., a mean, mode, or median value), the product or quotient of one or more of the anomaly values 114, and so forth. In some implementations, one or more of the anomaly values 114 may be positively or negatively weighted. For example, one or more of the anomaly values 114 may be multiplied by a positive or negative coefficient prior to summing the anomaly values 114. As another example, a positive or negative constant may be added to one or more of the anomaly values 114 prior to summing the anomaly values 114. In some implementations, one or more of the anomaly values 114 may be disregarded (e.g., the weight associated with that anomaly value 114 may be zero).

The threshold data 118 may include a threshold value that corresponds to the aggregate value 122. The anomaly determination module 116 may determine correspondence between the aggregate value 122 and the corresponding threshold value. Based on this correspondence, the anomaly determination 120 may indicate the presence of an anomaly associated with the request 102. For example, an anomalous request 102 may include characteristics associated with the network layer, transport layer, and application layer of a network stack that individually cause multiple small anomaly values 114 to be generated. Individually, none of the small anomaly values 114 may cause an anomaly to be determined. However, use the aggregate value 122, which may be based on each of the anomaly values 114, may enable detection of an anomaly that may otherwise have avoided detection. For example, FIG. 1 depicts the aggregate value 122 as 45%, determined by summing the first anomaly value 114(1), the second anomaly value 114(2), and the third anomaly value 114(3). The corresponding threshold value for the aggregate value is depicted as 40%. Therefore, because the aggregate value 45% exceeds the threshold value of 40%, the anomaly determination 120 may indicate that the request 102 is anomalous.

If the anomaly determination module 116 determines that a request 102 is anomalous, a control action 124 may be performed with respect to one or more of the request 102, the requesting device 104, or the destination device 106. For example, the request 102 may be rejected. The control action 124 may also include providing an alarm, a report, a request for user intervention, and so forth. In some implementations, the control action 124 may include updating, rotating, or otherwise modifying an access credential associated with the requesting device 104. In other implementations, the control action 124 may include modifying the rate at which the request 102 is processed, such as by processing anomalous requests at a slower rate. In still other implementations, a route or host device associated with receiving or transmitting the request 102 may be modified. For example, potentially malicious requests 102 may be routed to particular host devices configured to process potentially malicious data. In other implementations, the format of the request 102 may be modified. For example, a malicious request 102 provided in a PDF format may be converted to a JPG format to reduce the likelihood that particular malicious elements of the request 102 specific to the initial format may affect components of the system 100. In some implementations, data indicative of the request 102 or the requesting device 104 may be provided to one or more other devices or data structures, such as a threat list, to enable subsequent identification of similar anomalous requests 102. For example, correspondence between characteristics of a subsequent request 102 or the requesting device 104 and data indicative of a previous anomalous request 102 may be used to determine the anomalous nature of the subsequent request 102. In some implementations, the anomaly values 114 determined for an anomalous request 102 may be stored as anomaly data. A subsequent request 102 may cause the same set of anomaly values 114 to be generated, or a set of anomaly values 114 within a threshold tolerance thereof. Based on correspondence between the anomaly data and the anomaly values 114 for the subsequent request 102, the subsequent request 102 may be determined to be anomalous. In other implementations, the anomaly values 114 determined for a non-anomalous request 102 may be stored. A subsequent request 102 that causes the same set of anomaly values 114 to be generated, or a set of anomaly values 114 within a threshold tolerance thereof, may be determined to be non-anomalous. In some implementations, the particular control action 124 performed responsive to a potentially anomalous request 102 may be determined based on the extent to which anomaly values 114 for the potentially anomalous request 102 deviate from the threshold data 118. For example, if the anomaly values 114 for a request 102 indicate a strong likelihood that the request 102 is anomalous, the control action 124 may include a significant response, such as rejecting the request 102. If the anomaly value 114 for the request 102 indicates a slight likelihood that the request 102 is anomalous, the control action 124 may include a less significant response, such as updating access credentials associated with the request 102 or the requesting device 104.

Figure 2:
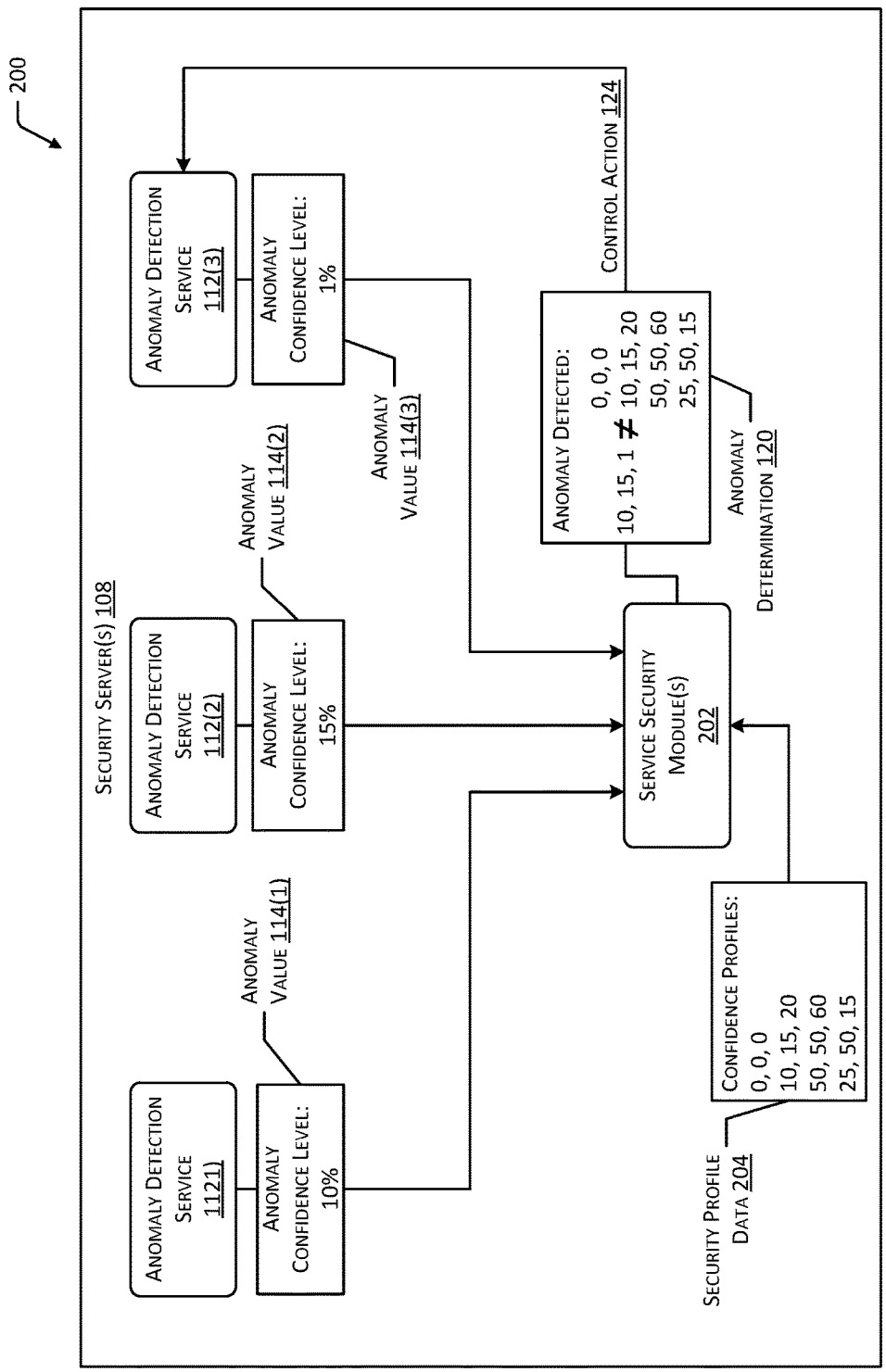
FIG. 2 depicts a system for determining anomalies associated with anomaly detection services.

FIG. 2 depicts a system 200 for determining anomalies associated with anomaly detection services 112. In some cases, a malicious or abnormal request 102 may cause a particular anomaly detection service 112 to determine an erroneous or abnormally small or large anomaly value 114. In other cases, an anomaly detection service 112 may, itself, be subjected to a malicious attack, an error, or other abnormalities that may affect one or more anomaly values 114 determined by that anomaly detection service 112. If an anomaly detection service 112 determines an erroneous anomaly value 114, the erroneous anomaly value 114 may cause a non-anomalous request 102 to be incorrectly determined as anomalous, or an anomalous request 102 to be incorrectly determined as non-anomalous. For example, an erroneous anomaly value 114 may exceed or fail to exceed a corresponding threshold value. Additionally, the erroneous anomaly value 114 cause the aggregate value 122, determined using a plurality of the anomaly values 114, to exceed or fail to exceed a corresponding threshold value.

A service security module 202 associated with the security server 108 may be used to determine whether one or more of the anomaly detection services 112 has generated a potentially erroneous anomaly value 114. The service security module 202 may determine correspondence between the anomaly values 114 generated by the anomaly detection services 112 and security profile data 204 indicative of one or more sets of anomaly values 114. In some implementations, the security profile data 204 may include sets of anomaly values 114 previously generated by the anomaly detection services 112 responsive to previous requests 102. For example, when a request 102 having a particular set of characteristics is received, each of the anomaly detection services 112 may determine a respective anomaly value 114 responsive to the request characteristics. If a subsequent request having identical or similar characteristics is received, each of the anomaly detection services 112 would be expected to determine identical or similar anomaly values 114. Over time, the sets of anomaly values 114 determined by the anomaly detection services 112 may indicate relationships between the anomaly detection services 112. For example, for each request where the first anomaly detection service 112(1) determines an anomaly value 114(1) ranging from 5% to 15%, the second anomaly detection service 112(2) may determine an anomaly value 114(2) ranging from 15% to 25%. If, responsive to a subsequent request 102, the first anomaly detection service 112(1) were to determine an anomaly value 114(1) ranging from 5% to 15%, but the second anomaly detection service 112(2) did not determine an anomaly value 114(2) that ranged from 15% to 25%, this may indicate an error or abnormality associated with one of the anomaly detection services 112.

FIG. 2 depicts example security profile data 204 including four sets of anomaly values 114, each set including an anomaly value 114 for each of the three depicted anomaly detection services 112. However, the security profile data 204 may include any quantity of sets of anomaly values 114, and each set of anomaly values 114 may include anomaly values 114 for any subset of the anomaly detection services 112. For example, a particular set of anomaly values 114 may include a single anomaly value 114(2) corresponding to the second anomaly detection service 112(2). As another example, a particular set of anomaly values 114 may include anomaly values 114 corresponding to the first anomaly detection service 112(1) and second anomaly detection service 112(2). In some implementations, the security profile data 204 may also include other request characteristics associated with one or more of the sets of anomaly values 114. For example, the security profile data 204 may include a first set of anomaly values 114 (e.g., 10, 15, 20) associated with a particular IP address of a request 102 and a second set of anomaly values 114 (e.g., 50, 50, 60) associated with a different IP address. In addition to determining correspondence between the anomaly values 114 for a current request 102 and the sets of anomaly values 114 of the security profile data 204, the security service module 202 may also determine correspondence between the request data 110 determined from the request 102 and the request characteristics of the security profile data 204.

FIG. 2 depicts the first anomaly detection service 112(1) determining a first anomaly value 114(1) of 10%, the second anomaly detection service 112(2) determining a second anomaly value 114(2) of 15%, and the third anomaly detection service 112(3) determining a third anomaly value 114(3) of 1%. Based on a lack of correspondence between the determined anomaly values 114 and any of the sets of anomaly values 114 of the security profile data 204, the service security module 202 may generate an anomaly determination 120 that indicates an anomaly associated with one or more of the anomaly detection services 112. In some implementations, the service security module 202 may determine the particular anomaly detection service(s) 112 that are anomalous. For example, the service security module 202 may disregard the anomaly values 114 of one or more anomaly detection services 112 and determine one or more sets of anomaly values 114 of the security profile data 204 that correspond to the remaining anomaly values 114. In the example shown in FIG. 2, if the third anomaly value 114(3) is disregarded, the anomaly values 114 for the first anomaly detection service 112(1) and the second anomaly detection service 112(2) would correspond to one of the sets of anomaly values 114 in the security profile data 204. This determination may indicate that the third anomaly detection service 112(3) is affected by an abnormality.

Based on the anomaly determination 120, a control action 124 may be performed with respect to one or more of the anomaly detection services 112. In some implementations, the control action 124 may include disregarding subsequent anomaly values 114 for the affected anomaly detection service 112 when determining an aggregate value 122 or when determining whether the individual anomaly value 114 of the affected anomaly detection service 112 indicates an anomalous request 102. In other implementations, the control action 124 may include modifying the weight associated with the anomaly value 114 of the affected anomaly detection service 112 when determining the aggregate value 122. For example, if an anomaly detection service 112 is determining abnormal anomaly values 114, the weight associated with that anomaly detection service 112 may be reduced. In some cases, the weight may be reduced by a quantity or percentage that corresponds to the quantity or percentage by which the anomaly values 114 deviate from the security profile data 204. For example, the weight associated with an anomaly detection service 112 may be decreased slightly if the anomaly values 114 deviate slightly from the security profile data 204, or decreased significantly if the anomaly values 114 deviate significantly from the security profile data 204. In still other implementations, the control action 124 may include modifying one or more inputs associated with the affected anomaly detection service 112, such as by configuring the anomaly detection service 112 to process a different portion of the request data 110. The control actions 124 may further include generating a report, an alarm, a request for user intervention, and so forth, with regard to the affected anomaly detection service 112.

In some implementations, user input may indicate that the anomaly detection service 112 is not compromised or affected by an abnormality. Responsive to this user input, the security profile data 204 may be modified to include the set of anomaly values 114 received responsive to the current request 102. If the anomaly detection services 112 subsequently generate an identical or similar set of anomaly values 114 responsive to a request 102, the service security module 202 may then determine that the anomaly detection services 112 are not affected by an anomaly. In other implementations, if user input indicates that the anomaly detection service 112 is affected by an abnormality, the set of anomaly values 114 associated with the abnormality may be stored as anomaly data. If the anomaly detection services 112 subsequently generate an identical or similar set of anomaly values 114 responsive to a request 102, the service security module 202 may then determine that one or more of the anomaly detection services 112 are affected by an anomaly.

Figure 3:
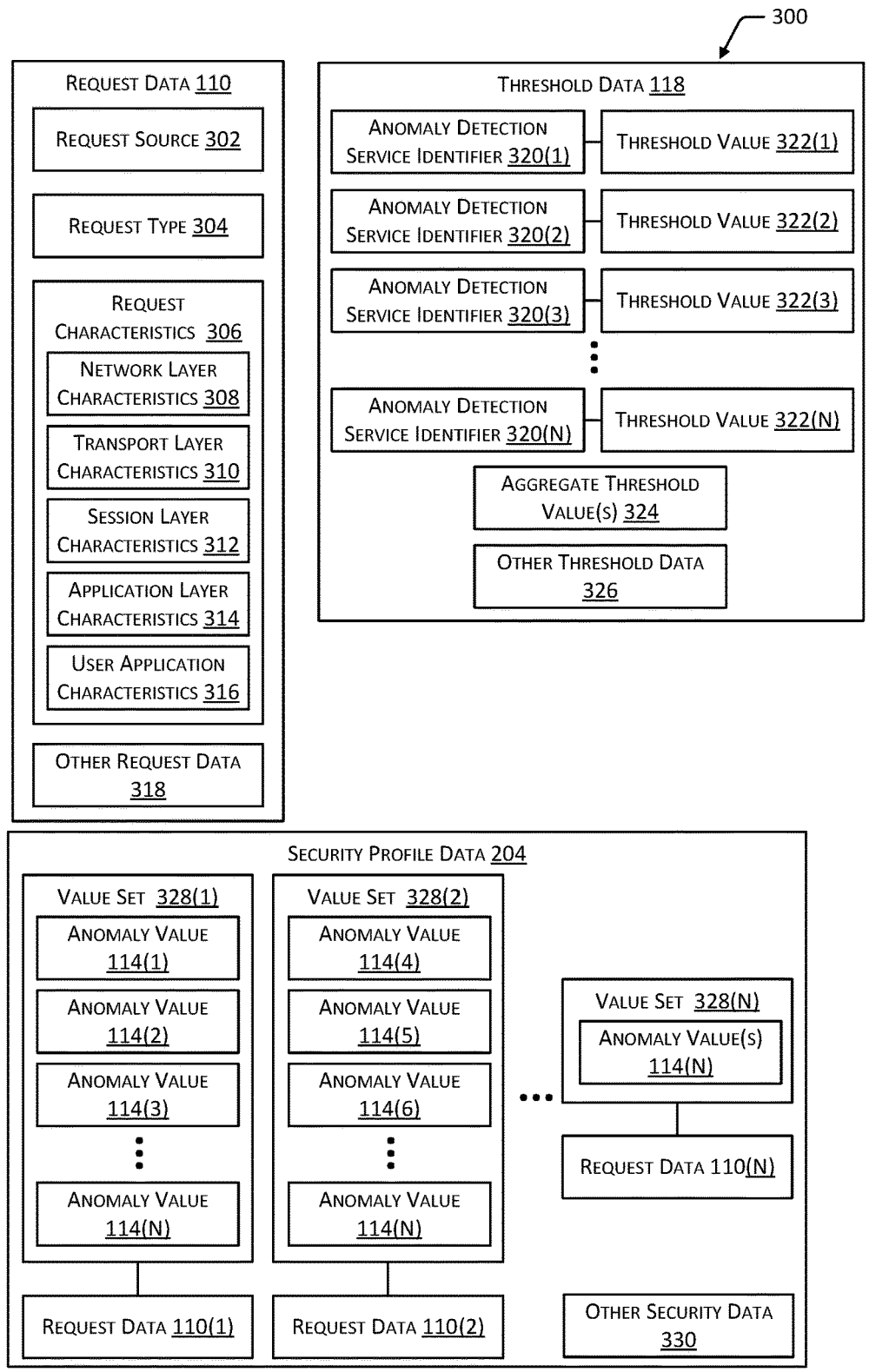
FIG. 3 depicts block diagrams illustrating example request data, threshold data, and security profile data.

FIG. 3 depicts block diagrams 300 illustrating example request data 110, threshold data 118, and security profile data 204. Request data 110 may include data or metadata indicative of one or more characteristics of a request 102. For example, the request data 110 may include a request source 302. The request source 302 may indicate one or more of a location, device, user, account, or other source or origin associated with the request 102. For example, the request source 302 may include a geographic location at which a request 102 was generated or provided, an IP address, MAC address, or other network identifier associated with a requesting device 104, user data indicative of a particular user or user account associated with the request 102, and so forth. In some implementations, the request source 302 may be used to determine anomalous or non-anomalous requests 102. For example, a particular IP address or other data indicative of the request source 302 may be included on a list of potentially anomalous sources (e.g., a threat list or blacklist), or on a list of trusted sources (e.g., a whitelist). Continuing the example, a count of previous requests 102 associated with a request source 302 that have been determined to be anomalous or non-anomalous may be recorded. The count of anomalous or non-anomalous requests 102 associated with a request source 302 may affect the anomaly value 114 determined with regard to the request 102. The request source 302 may also be used to determine anomalous or non-anomalous anomaly detection services 112. For example, the security profile data 204 may include one or more request sources 302 or other characteristics stored in association with sets of anomaly values 114. Correspondence or a difference between the request source 302 of a current request 102 and the request source(s) 302 of the security profile data 204 may indicate a potentially anomalous or non-anomalous anomaly detection service 112.

The request data 110 may also include data or metadata indicative of a request type 304. A request 102 may include one or more types or categories related to one or more of the type of data within the request 102, a purpose or function of the request 102, the location or identity of the requesting device 104 or the destination device 106, and so forth. For example, the request type 304 may indicate that a request 102 includes a service call for a particular application executing on the destination device 106. In some implementations, the request type 304 may be used to determine anomalous or non-anomalous requests 102. For example, a particular destination device 106 may not be configured to process certain types of requests 102, or processing of requests 102 having a certain request type 304 may require certain access credentials or permissions. If an improper or unsupported request type 304 is determined, or if the requesting device 104 lacks sufficient access credentials or permissions, this determination may indicate an anomalous request 102. The request type 304 may also be used to determine anomalous or non-anomalous anomaly detection services 112. For example, the security profile data 204 may include one or more request types 304 or other characteristics stored in association with sets of anomaly values 114. Correspondence or a difference between the request type 304 of a current request 102 and the request types 304 of the security profile data 204 may indicate a potentially anomalous or non-anomalous anomaly detection service 112.

The request data 110 may also include one or more request characteristics 306. Request characteristics 306 may include content of a request 102 associated with various levels of a network stack. For example, request characteristics 306 may include network layer characteristics 308, such as an IP address, internet control message protocol (ICMP) information, address resolution protocol (ARP) information, a particular path or route of a network connection, and so forth. Network layer characteristics 308 may also include characteristics of transmitted data, such as packet lengths, types, arrangements, and content. As another example, request characteristics 306 may include transport layer characteristics 310, such as TCP, TLS, or user datagram protocol (UDP) fields, extensions, or other information. As yet another example, request characteristics 306 may include session layer characteristics 312, such as SSL or session initiation protocol (SIP) fields, extensions, and so forth. Request characteristics 306 may also include application layer characteristics 314 such as HTTP header information or versions, file transfer protocol (FTP) information, domain name server (DNS) information, and so forth. Request characteristics 306 may further include user application characteristics 316, such as expressions, data types, and so forth that may be specific to one or more particular applications associated with a requesting device 104 or destination device 106. Request characteristics 306 may be used to determine anomalous or non-anomalous requests 102. For example, anomaly detection services 112 may be configured to use particular request characteristics 306 associated with particular levels of the network stack as inputs to generate anomaly values 114 as outputs. In some implementations, request characteristics 306 may also be used to determine anomalous or non-anomalous anomaly detection services 112. For example, the security profile data 204 may include one or more request characteristics 306 stored in association with sets of anomaly values 114. Correspondence or a difference between the request characteristics 306 of a current request 102 and the request characteristics 306 of the security profile data 204 may indicate a potentially anomalous or non-anomalous anomaly detection service 112.

Other request data 318 may include other request characteristics 306, such as characteristics associated with other levels of the network stack, encryption schemes associated with the request 102, access credentials associated with the request 102 or requesting device 104, and so forth. The other request data 318 may be used to determine anomalous or non-anomalous requests 102 or anomaly detection services 112. For example, one or more of the threshold data 118 or the security profile data 204 may include other request data 318. Correspondence between other request data 318 associated with a current request 102 and the threshold data 118 may be used to determine anomalous or non-anomalous requests 102. Correspondence between the other request data 318 associated with a current request 102 and the security profile data 204 may be used to determine anomalous or non-anomalous anomaly detection services 112.

The threshold data 118 may associate one or more anomaly detection service identifiers 320, associated with one or more of the anomaly detection services 112, with one or more threshold values 322, associated with the determined anomaly values 114. The anomaly detection service identifiers 320 may include any manner of alphanumeric data, image data, audio data, or other types of data indicative of one or more of the anomaly detection services 112. In some implementations, the anomaly detection service identifiers 320 may include machine readable data that may not be readily interpretable by a human user. For example, a first anomaly detection service identifier 320(1) may be associated with the first anomaly detection service 112(1), a second anomaly detection service identifier 320(2) may be associated with the second anomaly detection service 112(2), and a third anomaly detection service identifier 320(3) may be associated with the third anomaly detection service 112(3). Any number of additional anomaly detection service identifiers 320(N) may be associated with any number of additional anomaly detection services 112.

At least a subset of the anomaly detection service identifiers 320 may be stored in association with a corresponding threshold value 322. For example, the first anomaly detection service identifier 320(1) may be stored in association with a first threshold value 322(1), the second anomaly detection service identifier 320(2) may be stored in association with a second threshold value 322(2), and the third anomaly detection service identifier 320(3) may be stored in association with a third threshold value 322(3). Any number of additional threshold values 322(N) may be stored in association with any number of additional anomaly detection service identifiers 320(N). The threshold values 322 may include any manner of alphanumeric data, image data, audio data, or other types of data. In some implementations, the threshold values 322 may include machine readable data that may not be readily interpretable by a human user.

As described previously with regard to FIG. 1, the anomaly determination module 116 may determine anomalous or non-anomalous requests 102 by determining correspondence between the anomaly values 114 determined by one or more of the anomaly detection services 112(1) and the threshold data 118. For example, if the anomaly value 114(1) determined by the first anomaly detection service 112(1) exceeds the first threshold value 322(1), this determination may indicate that the request 102 is anomalous. Similarly, if the second anomaly value 114(2) or the third anomaly value 114(2) exceeds the second threshold value 322(2) or the third threshold value 322(3), respectively, this determination may indicate that the request 102 is anomalous. In other implementations, an anomaly may be determined if an anomaly value 114 falls below a threshold value 322, matches a threshold value 322, fails to match a threshold value 322, falls within a threshold tolerance of a threshold value 322, or falls outside of a threshold tolerance of a threshold value 322. In still other implementations, one or more threshold values 322 may include dynamic values. For example, a threshold value 322 may be determined based on an average anomaly value 114 received for a particular anomaly detection service 112 over a period of time. If an anomaly value 114 that deviates from the average anomaly value 114 by more than a threshold quantity or percentage is received (e.g., an outlier value), the deviating anomaly value 114 may be determined to be anomalous. As such, threshold values 322 may change over time as additional anomaly values 114 are determined. In some implementations, user input may be used to modify the threshold values 322. For example, user input indicating that a particular outlier value is non-anomalous may cause a threshold value 322 to be modified to include the outlier value.

The threshold data 118 may also include one or more aggregate threshold values 324. The aggregate threshold value(s) 324 may include any manner of alphanumeric data, image data, audio data, or other types of data. In other implementations, the aggregate threshold value(s) 324 may include machine readable data that may not be readily interpretable by a human user. In some implementations, the aggregate threshold value(s) 324 may be stored in association with one or more anomaly detection service identifiers 320 or one or more request characteristics 306, request types 304, or request sources 302. For example, a first aggregate threshold value 324 may be used for requests 102 processed by a first set of anomaly detection services 112 and a second aggregate threshold value 324 may be used for requests processed by a second set of anomaly detection services 112. As another example, a first aggregate threshold value 324 may be used for requests 102 received from a first request source 302, and a second aggregate threshold value 324 may be used for requests 102 received from a second request source 302. As described previously with regard to FIG. 1, the anomaly determination module 116 may determine anomalous or non-anomalous requests 102 by determining correspondence between the aggregate threshold value 124 and the aggregate value 122, determined based on one or more of the anomaly values 114. For example, if the aggregate value 122 exceeds the corresponding aggregate threshold value 324, this determination may indicate that the request 102 is anomalous. In other implementations, an anomaly may be determined if an aggregate value 122 falls below an aggregate threshold value 324, matches an aggregate threshold value 324, fails to match an aggregate threshold value 324, falls within a threshold tolerance of an aggregate threshold value 324, or falls outside of a threshold tolerance of an aggregate threshold value 324.

Other threshold data 326 may include request characteristics 306, request types 304, or request sources 302 stored in association with one or more of the threshold values 322. For example, a particular threshold value 322 associated with the first anomaly detection service identifier 320(1) may be used for requests 102 having a first request type 304. A different threshold value 322 associated with the first anomaly detection service identifier 320(1) may be used for requests 102 having a second request 304. Other request data 326 may also include threshold tolerances by which one or more anomaly values 114 or aggregate values 122 may differ from threshold values 322 or aggregate threshold values 324 to determine an anomaly. Threshold tolerances may include fixed quantities, percentages or relative quantities, Boolean determinations, and so forth.

The security profile data 204 may associate anomaly values 114 from different anomaly detection sensors 112 that are determined in response to a particular event (e.g., a particular request 102 or other data). For example, the security profile data 204 may include a first value set 328(1) that includes a first anomaly value 114(1), a second anomaly value 114(2), a third anomaly value 114(3), and any number of additional anomaly values 114(N). FIG. 3 depicts the security profile data 204 including a second value set 328(2) that includes a fourth anomaly value 114(4), a fifth anomaly value 114(5), a sixth anomaly value 114(6), and any number of additional anomaly values 114(N). The security profile data 204 may include any number of additional value sets 328(N) having any number of associated anomaly values 114(N).

As described previously with regard to FIG. 2, a service security module 202 may determine whether an abnormality is affecting one or more of the anomaly detection services 112 by determining correspondence between the security profile data 204 and a set of anomaly values 114 determined responsive to a current request 102. For example, if the set of anomaly values 114 for the current request 102 matches or falls within a threshold tolerance of one of the value sets 328 of the security profile data 204, this determination may indicate that no anomalies affecting the anomaly detection services 112 were detected. If the set of anomaly values 114 for the current request 102 does not match or falls outside of a threshold tolerance of any of the value sets 328 of the security profile data 204, this determination may indicate that one or more of the anomaly detection services 112 is affected by an abnormality.

In some implementations, one or more of the value sets 328 may be stored in association with request data 110. For example, a particular value set 328 may be stored in association with a particular request source 302. If anomaly values 114 that correspond to the particular value set 328 are determined from a request 102 associated with a different request source 302, the mismatch between the request source 302 and the security profile data 204 may indicate an anomaly. In some implementations, the request data 110 associated with a request 102 may differ from the request data 110 of the security profile data 204 by more than a threshold tolerance before an anomaly is determined. Other security data 330 may include request data 110 independent of value sets 328. For example, particular request sources 302 may be indicative of anomalous or non-anomalous requests 102 independent of the anomaly values 114 determined responsive to the requests 102. Continuing the example, particular request sources 302 may be included on a blacklist or threat list, or on a whitelist or trusted list. In other implementations, particular request types 304 or request characteristics 306 may be determined as anomalous or non-anomalous independent of the associated anomaly values 114.

Figure 4:
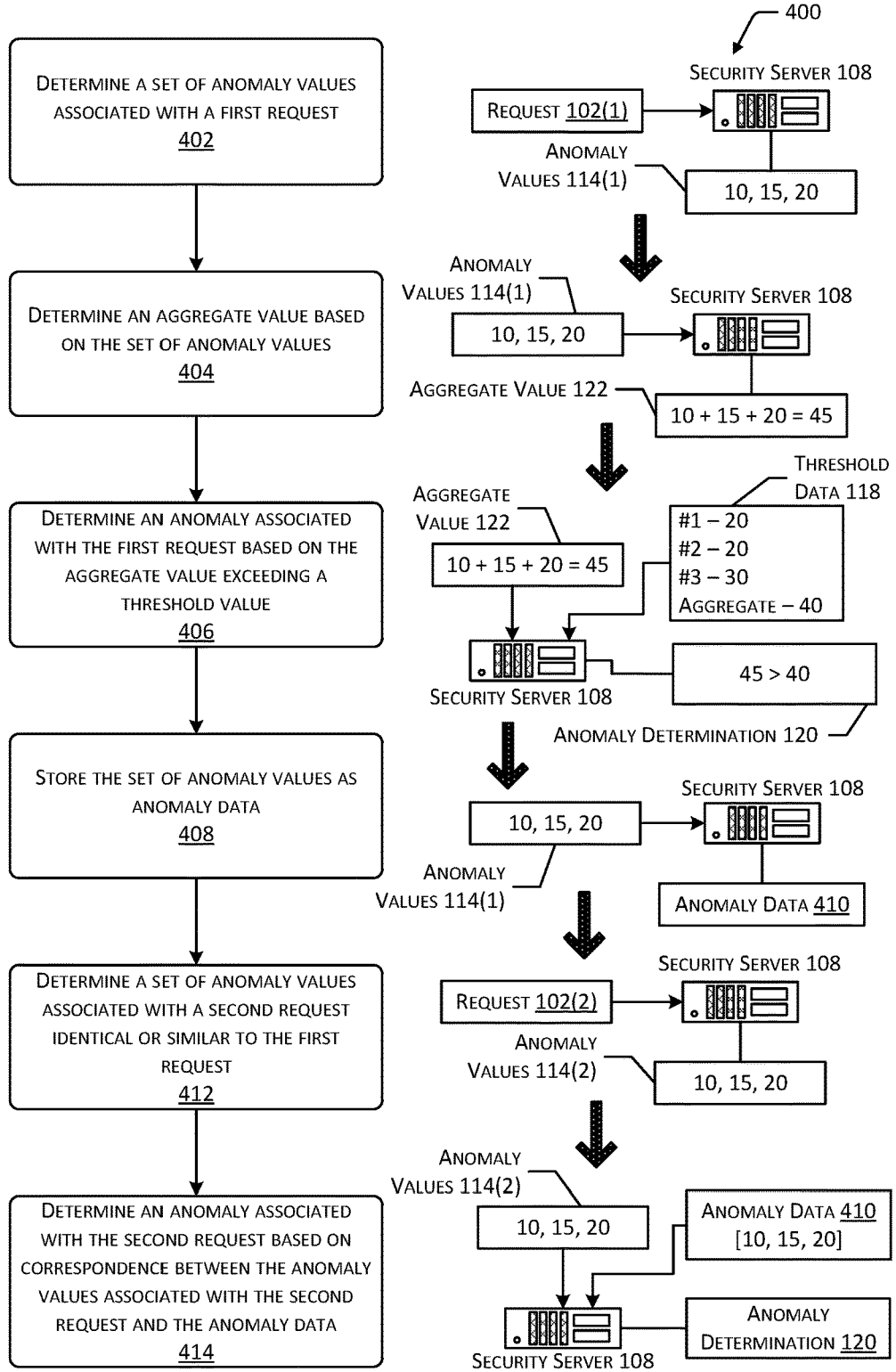
FIG. 4 depicts a scenario illustrating a method for determining anomalies using aggregate values and data associated with previous anomalous requests.

FIG. 4 depicts a scenario 400 illustrating a method for determining anomalies using aggregate values 122 and data associated with previous anomalous requests 102. At 402, a set of anomaly values 114(1) associated with a first request 102(1) is determined. As described previously with regard to FIG. 1, one or more anomaly detection services 112 associated with a security server 108 may determine request data 110 associated with a request 102(1). Based on the request data 110, the anomaly detection services 112 may determine anomaly values 114 indicative of the likelihood that the request 102(1) is anomalous. For example, a first anomaly detection service 112 may determine request data 110 associated with a first layer of a network stack, such as characteristics of IP packets associated with the request 102. A second anomaly detection service 112 may determine request data 110 associated with a second layer of the network stack, such as fields or extensions associated with a TCP, SSL, or TLS communication. Other anomaly detection services 112 may similarly determine request data 110 associated with other layers of the network stack or other metadata associated with the request 102, such as a request source 302 or request type 304. Based on the respective portion(s) of the request data 110 determined by the anomaly detection services 112, each anomaly detection service 112 may determine an anomaly value 114 indicative of the likelihood that the processed request data 110 may indicate an anomaly.

At 404, an aggregate value 122 may be determined based on the anomaly values 114(1). For example, one or more individual anomaly values 114(1) may be used to determine the presence or absence of an anomaly (e.g., based on correspondence between the individual anomaly value(s) 114(1) and threshold data 118). However, in some cases, a malicious or anomalous request 102 may cause the generation of small anomaly values 114(1) that are insufficient to trigger an alert or cause a control action to be performed. Determination of an aggregate value 122 based on at least a subset of the anomaly values 114(1) may enable the detection of anomalies that may otherwise have been undetected. In some implementations, the aggregate value 122 may include the sum of one or more of the anomaly values 114(1). In other implementations, the aggregate value 122 may be determined using a more complex algorithm. For example, one or more of the anomaly values 114(1) may be weighted (e.g., multiplied by a coefficient), modified by a constant, or disregarded. In some cases, the weights or modifications associated with an anomaly value 114(1) may vary depending on one or more rules. For example, a rule may state that if a first anomaly value 114(1) exceeds a first quantity, then the weight associated with the first anomaly value 114(1) is doubled when determining an aggregate value 122. Other rules may modify the weight or a constant associated with an anomaly value 114(1) based on other anomaly values 114(1), request data 110, the requesting device 104, the destination device 106, and so forth. Rules may also be based on other factors, such as a date or time at which the request 102 was provided, a frequency at which requests 102 are provided from the requesting device 104 or received by the destination device 106, and so forth.

At 406, an anomaly associated with the first request 102(1) may be determined based on the aggregate value 122 exceeding a threshold value 322. In other implementations, an anomaly may be determined if the aggregate value 122 is less than the threshold value 322, differs from the threshold value 322 by more than a threshold tolerance, or falls within a threshold tolerance of the threshold value 322. Responsive to the determination of an anomaly, a control action 124 may be performed with regard to the request 102(1). For example, the control action 124 may include rejecting the request 102(1), modifying the rate at which the request 102(1) is processed, modifying access credentials associated with the request 102(1) or a requesting device 104, generation of a report or an alarm, and so forth. In some implementations, the control action 124 may include providing data indicative of the request 102(1) or a requesting device 104 associated with the request 102(1) to other devices.

For example, at 408, the set of anomaly values 114(1) associated with the request 102(1) may be stored as anomaly data 410. The anomaly data 410 may include one or multiple sets of anomaly values 114 previously received responsive to an anomalous request 102 or other anomalous data. In some implementations, the anomaly data 410 may also include request data 110 stored in association with the sets of anomaly values 114, such as data indicative of the request source 302, request type 304, or one or more request characteristics 306. The anomaly data 410 may be used to determine subsequent anomalous requests 102 in addition to or in lieu of determining whether the anomaly values 114 for the subsequent request(s) 102 exceed a threshold value 322.

For example, at 412, a set of anomaly values 114(2) associated with a second request 102(2) identical or similar to the first request 102(1) may be determined. Continuing the example, when a request 102(2) that is identical or similar to a previous request 102(1) is received, the anomaly values 114(2) determined for the second request 102(2) may be identical or similar to those determined for the first request. Therefore, if an identical or similar set of anomaly values 114 is determined for a subsequent request 102(2), that subsequent request 102(2) may be determined as anomalous due to its similarities to the first request 102(1).

At 414, an anomaly associated with the second request 102(2) may be determined based on correspondence between the anomaly values 114(2) associated with the second request 102(2) and the anomaly data 410. For example, if the anomaly values 114(2) determined for the second request 102(2) match or fall within a threshold tolerance of the anomaly values 114 associated with a previous anomalous request 102(1), this may indicate that the second request 102(2) is also anomalous. The correspondence between the anomaly values 114(2) for the second request 102(2) and the anomaly data 410 may be determined in addition to or in lieu of correspondence between the anomaly values 114(2) for the second request 102(2) and threshold data 118.

Figure 5:
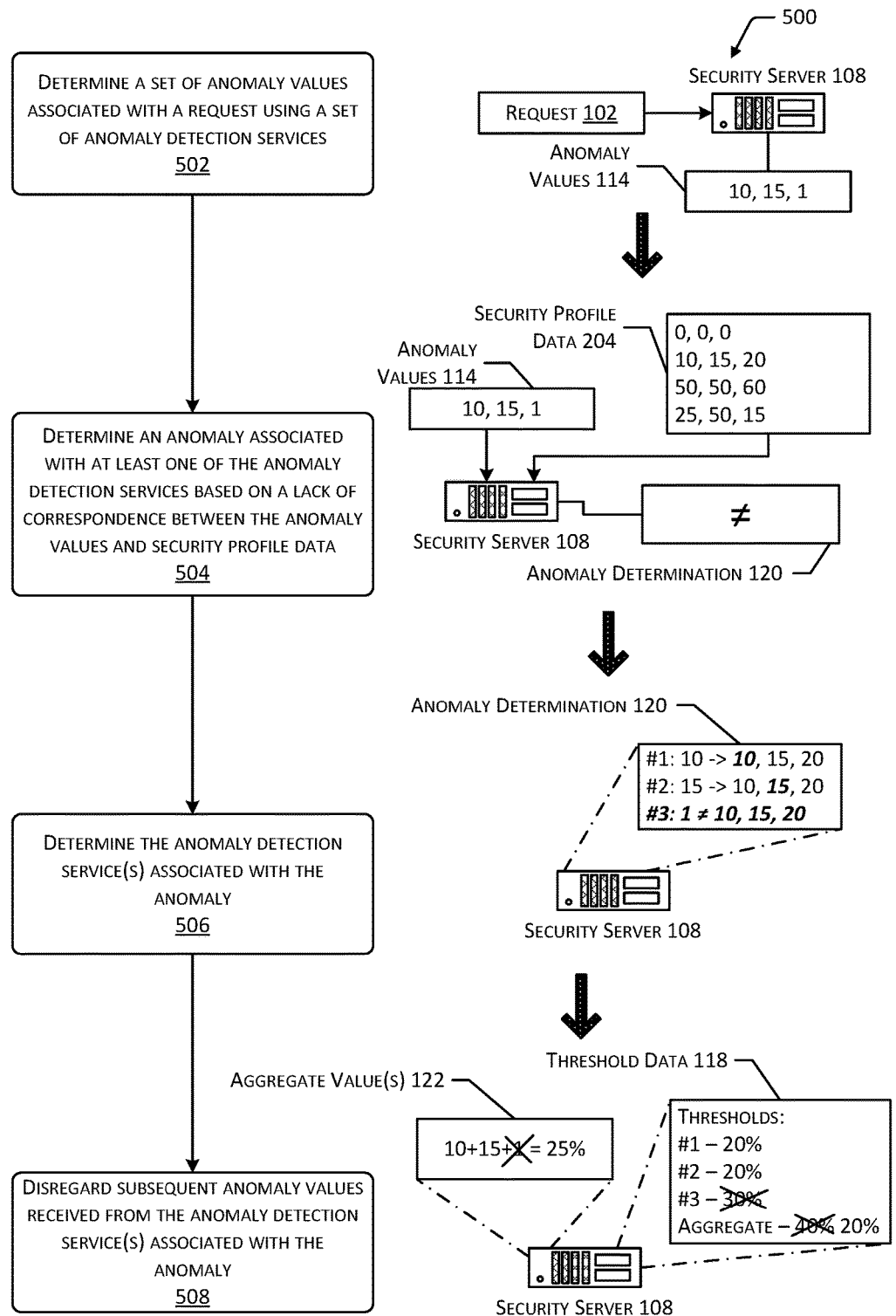
FIG. 5 depicts a scenario illustrating a method for determining anomalies associated with anomaly detection services and reducing the effect of the anomalies on subsequent determinations.

FIG. 5 depicts a scenario 500 illustrating a method for determining anomalies associated with anomaly detection services 112 and reducing the effect of the anomalies on subsequent determinations. At 502, a set of anomaly values 114 associated with a request 102 may be determined using a set of anomaly detection services 112. As described previously with regard to FIG. 1, an anomaly detection service 112 may determine request data 110 associated with the request 102 and may determine anomaly values 114 based on the request data 110.

At 504, an anomaly associated with at least one of the anomaly detection services 112 may be determined, based on a lack of correspondence between the anomaly values 114 and security profile data 204. As described previously with regard to FIG. 2, security profile data 204 may include sets of anomaly values 114 that are generated by a set of anomaly detection services 112 responsive to a particular request 102, set of requests 102, or other data. If the anomaly values 114 determined for a request 102 match or fall within a threshold tolerance of the anomaly values 114 of the security profile data 204, the anomaly values 114 generated by the anomaly detection services 112 may be determined to be accurate. However, if the anomaly values 114 associated with the request 102 do not correspond to the security profile data 204, this may indicate that one or more of the anomaly detection services 112 are generating inaccurate anomaly values 114.

At 506, the anomaly detection service(s) 112 associated with the anomaly may be determined. For example, the service security module 202 or another module associated with the security server 108 may determine particular anomaly values 114 associated with the request 102 that do not match or fall within a threshold tolerance of any sets of anomaly values 114 of the security profile data 204. As another example, the service security module 202 or another module associated with the security server 108 may disregard one or more anomaly values 114 such that the remaining anomaly values 114 correspond to the security profile data 204, thereby determining that the disregarded anomaly values 114 are associated with an anomalous anomaly detection service 112. A control action 124 may be performed with regard to one or more of the anomaly detection services 112 affected by an anomaly.

For example, at 508, one or more subsequent anomaly values 114 received from the anomaly detection service(s) 112 associated with the anomaly may be disregarded. As another example, the algorithm(s) used to determine the aggregate values(s) 122 may be modified to remove reference to anomaly values 114 determined by an anomalous anomaly detection service 112 or to reduce a weight associated with the anomaly values 114. In some implementations, the threshold data 118 may also be modified based on the determination of an anomalous anomaly detection service 112. For example, if the algorithm for determining the aggregate value 122 is modified to disregard a particular anomaly value 114, the threshold value 302 associated with the aggregate value 122 may also be modified. Continuing the example, threshold values 322 that correspond to a single anomaly value 114 generated by an anomalous anomaly detection service 112 may be increased, decreased, or disregarded. Modification of the threshold data 118 may prevent anomalous anomaly detection services 112 from improperly detecting anomalous requests 102 as non-anomalous or detecting non-anomalous requests 102 as anomalous.

Figure 6:
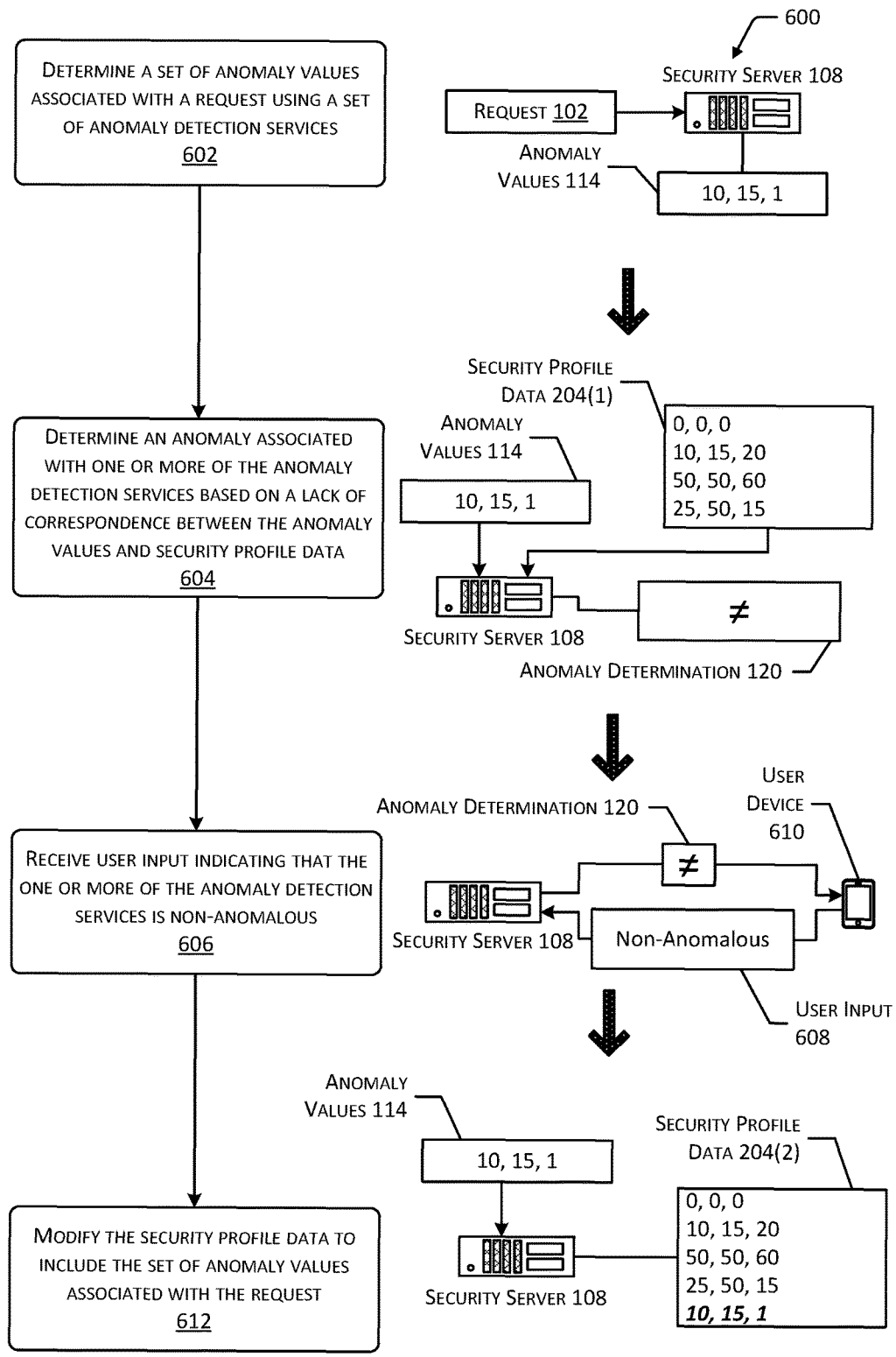
FIG. 6 depicts a scenario illustrating a method for modifying security profile data based on user input confirming non-anomalous anomaly detection services.

FIG. 6 depicts a scenario 600 illustrating a method for modifying security profile data 204 based on confirmation of non-anomalous anomaly detection services 112. At 602 a set of anomaly values 114 associated with a request 102 may be determined using a set of anomaly detection services 112. As described previously with regard to FIG. 1, an anomaly detection service 112 may determine request data 110 associated with the request 102 and may determine anomaly values 114 based on the request data 110.

At 604, an anomaly associated with one or more of the anomaly detection services 112 may be determined based on a lack of correspondence between the anomaly values 114 and security profile data 204(1). As described previously with regard to FIG. 2, security profile data 204(1) may include sets of anomaly values 114 that are generated by a set of anomaly detection services 112 responsive to a particular request 102, set of requests 102, or other data. If the anomaly values 114 determined for a request 102 match or fall within a threshold tolerance of the anomaly values 114 of the security profile data 204, the anomaly values 114 generated by the anomaly detection services 112 may be determined to be accurate. However, if the anomaly values 114 associated with the request 102 do not correspond to the security profile data 204(1), this may indicate that one or more of the anomaly detection services 112 are generating inaccurate anomaly values 114.

At 606, user input 608 may be received indicating that the one or more of the anomaly detection services is non-anomalous. For example, an anomaly determination 120 indicative of the lack of correspondence between the security profile data 204(1) and the anomaly values 114 may be provided to a user device 610 or another type of computing device. The user device 610 may be used to provide user input 608 to the security server 108 confirming the determined anomaly value(s) 114 (e.g., indicating that the anomaly detection service(s) 112 are not affected by an anomaly). In other implementations, confirmation of the anomaly values 114 and the proper functioning of the anomaly detection services 112 may be performed by the securing server 108, the destination device 106, or another computing device in communication therewith.

At 612, the security profile data 204(1) may be modified to include the set of anomaly values 114 associated with the request. For example, the anomaly values 114 determined responsive to the request 102 may not correspond to initial security profile data 204(1). However, responsive to confirmation that the anomaly values 114 are not the product of an abnormality associated with an anomaly detection service 112, the anomaly values 114 may be added to the initial security profile data 204(1) to form modified security profile data 204(2). If a subsequent request 102 is received that causes generation of the same anomaly values 114, the anomaly values 114 associated with the subsequent request may correspond to the security profile data 204(2). Correspondence between the anomaly values 114 associated with the subsequent request and the security profile data 204(2) may indicate that the anomaly detection services 112 are not affected by an abnormality.

In some implementations, modification of security profile data 204 may be performed using one or more machine learning techniques. For example, the security server 108 or another computing device associated therewith may use K means clustering to generate the security profile data 204 based on previously determined anomaly values 114. User input 608 indicating that a newly determined set of anomaly values 114 is a legitimate (e.g., non-anomalous) cluster may cause the security server 108 or other computing device to modify one or more clusters of anomaly values 114.

Figure 7:
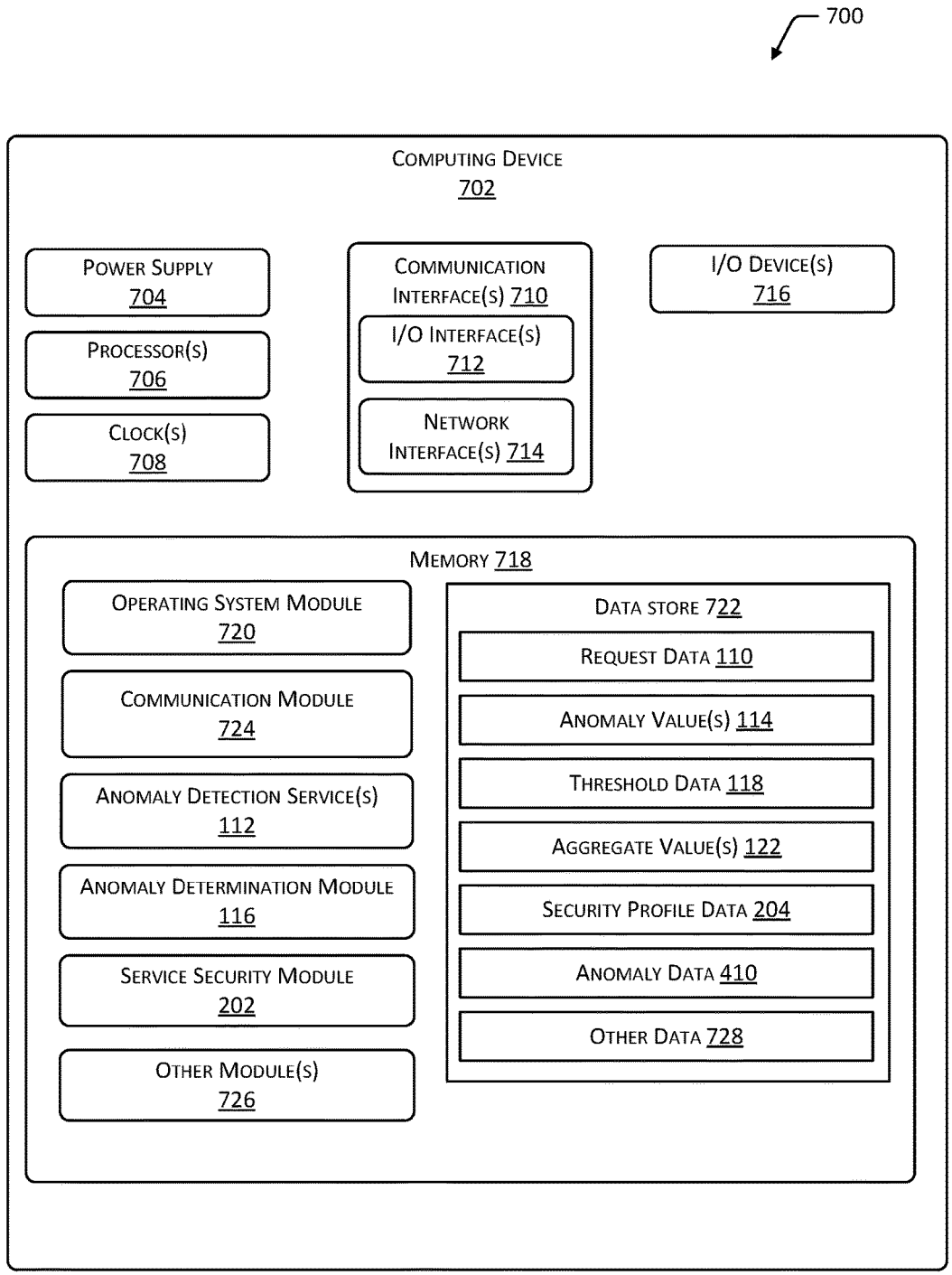
FIG. 7 is a block diagram depicting a computing device within the scope of the present disclosure.

FIG. 7 is a block diagram 700 depicting a computing device 702 within the scope of the present disclosure. The computing device 702 may include security servers 108, requesting devices 104, destination devices 106, user devices 610, or other computing devices 702 in communication therewith.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clocks 708 may provide information indicative of date, time, ticks, and so forth. For example, the processor(s) 706 may use data from the clock 708 to generate a timestamp, trigger a preprogrammed action, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components of the other computing devices 702. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input device or output device associated with the computing device 702. For example, I/O devices 716 may include touch sensors, keyboards, mouse devices, microphones, image sensors (e.g., cameras), scanners, displays, speakers, haptic devices, printers, and so forth. In some implementations, the I/O devices 716 may be physically incorporated with the computing device 702 or may be externally placed.

The network interfaces 714 may be configured to provide communications between the computing device 702 and other devices, such as the I/O devices 716, routers, access points, and so forth. The network interfaces 714 may include devices configured to couple to one or more networks including LANs, wireless LANs, WANs, wireless WANs, and so forth. For example, the network interfaces 714 may include devices compatible with Ethernet, Wi-Fi®, Bluetooth®, ZigBee®, Z-Wave, 3G, 4G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 722 and one or more of the following modules may also be stored in the memory 718. The modules may be executed as foreground applications, background tasks, daemons, and so forth. The data store 722 may use a flat file, database, linked list, tree, executable code, script, or other data structure to store information. In some implementations, the data store 722 or a portion of the data store 722 may be distributed across one or more other devices including other computing devices 702, network attached storage devices, and so forth.

A communication module 724 may be configured to establish communications with one or more other computing devices 702. The communications may be authenticated, encrypted, and so forth.

The memory 718 may store the anomaly detection services 112. As described previously with regard to FIG. 1, anomaly detection services 112 may include any manner of program, service, process, application, daemon, or code configured to process at least a portion of request data 110, associated with a request 102 or other data, as inputs and generate an anomaly value 114 as an output. For example, an anomaly detection service 112 may determine correspondence between at least a portion of the request data 110 and predetermined or user input data indicative of expected characteristics of non-anomalous requests. If correspondence is not determined, this may indicate that the request 102 or other data has a greater likelihood of being anomalous. The anomaly value 114 may be indicative of a probability, rating, score, or other evaluator associated with the presence of an anomaly in the request 102 or other data.

The memory 718 may also store the anomaly determination module 116. The anomaly determination module 116 may determine the presence or absence of anomalies associated with the request 102 based on the anomaly values 114 determined by the anomaly detection services 112. For example, the anomaly determination module 116 may determine correspondence between one or more of the anomaly values 114 and threshold data 118 that includes corresponding threshold values for at least a subset of the anomaly values 114. In some implementations, the anomaly determination module 116 may determine correspondence between one or more of the request source 302, request type 304, or request characteristics 306 associated with the request 102 and the threshold data 118. For example, the threshold data 118 may include permitted or expected request sources 302, request types 304, request characteristics 306, and so forth. The anomaly determination module 116 may also determine an aggregate value 122 based on at least a subset of the anomaly values 114. In some implementations, the aggregate value 122 may include a sum of at least a subset of the anomaly values 114. In other implementations, the aggregate value 122 may include one or more average values (e.g., a mean, mode, or median value), the product or quotient of one or more of the anomaly values 114, and so forth. In some implementations, one or more of the anomaly values 114 may be positively or negatively weighted (e.g., multiplied by a coefficient or modified by a constant). In other implementations, when determining the aggregate value 122, one or more of the anomaly values 114 may be disregarded (e.g., the weight associated with one or more anomaly values 114 may be zero).

If the anomaly determination module 116 determines that a request 102 is anomalous, the anomaly determination module 116 may cause a control action 124 may be performed with respect to one or more of the request 102, the requesting device 104, or the destination device 106. In some implementations, data indicative of an anomalous request may be stored as anomaly data 410. The anomaly determination module 116 may determine correspondence between the anomaly data 410 and anomaly values 114 associated with a subsequent request 102, indicating that the subsequent request 102 is anomalous. In other implementations the anomaly values 114 determined for a non-anomalous request 102 may be stored (e.g., as trusted, whitelisted, or non-anomalous data). The anomaly determination module 116 may determine correspondence between this data and anomaly values 114 associated with a subsequent request 102, indicating that the subsequent request 102 is non-anomalous.

The memory 718 may further include the service security module 202. The service security module 202 may determine whether one or more of the anomaly detection services 112 has generated a potentially erroneous anomaly value 114. For example, the service security module 202 may determine correspondence between anomaly values 114 generated by anomaly detection services 112 and security profile data 204 indicative of one or more sets of anomaly values 114 previously generated responsive to requests 102 or other data. If correspondence between the security profile data 204 and the anomaly values 114 is determined, the anomaly detection services 112 may be determined to be unaffected by an anomaly. If correspondence between the security profile data 204 and the anomaly values 114 is not determined, one or more anomaly detection services 112 may be determined to be generating inaccurate anomaly values 114. Based on a determined anomaly, the security service module 202 may cause one or more control actions 124 to be generated with regard to one or more anomaly detection services 112. In some implementations, user input 608 may indicate that the anomaly detection service 112 is not compromised or affected by an abnormality. Responsive to this user input 608, the security profile data 204 may be modified to include the set of anomaly values 114 received responsive to the request 102, such that if the same set of anomaly values 114 is generated at a future time, the anomaly values 114 will correspond to the security profile data 204.

Other modules 726 may also be present in the memory 718. For example, encryption modules may be used to encrypt and decrypt communications between computing devices 702. Authentication modules may be used to authenticate communications sent or received by computing devices 702 and to modify access credentials as part of a control action 124 responsive to an anomaly. Other modules 726 may further include separate modules for machine learning, processing user input 608, and so forth.

Other data 728 within the data store 722 may include user input data, such as configurations and settings associated with computing devices 702. Other data 728 may include security data, such as encryption keys and schema, access credentials, and so forth.

In different implementations, different computing devices 702 may have different capabilities or capacities. For example, security servers 108 may have significantly more processor 706 capability and memory 718 capacity compared to the processor 706 capability and memory 718 capacity of requesting devices 104, destination devices 106, user devices 610, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions; and
   one or more hardware processors configured to execute the computer-executable instructions to:
      access security profile data including sets of previously generated anomaly values for a plurality of anomaly detection services configured to determine anomalous data associated with one or more levels of a network stack, the sets of previously generated anomaly values indicative of non-anomalous functioning of the plurality of anomaly detection services;
      receive a request at the plurality of anomaly detection services;
      generate, at the plurality of anomaly detection services, detected anomaly values associated with the request, the detected anomaly values indicative of confidence that the request is not anomalous;
      determine a difference between the detected anomaly values and the sets of previously generated anomaly values of the security profile data, the difference exceeding a threshold value;
      based on the difference, determine at least one detected anomaly value associated with the request that deviates from at least one of the sets of previously generated anomaly values of the security profile data;
      determine at least one anomaly detection service of the plurality of anomaly detection services associated with the at least one detected anomaly value deviating from the at least one of the sets of previously generated anomaly values of the security profile data; and
      execute a control action associated with the at least one anomaly detection service, the control action including reducing a weight associated with anomaly detection for one or more subsequent detected anomaly values received from the at least one anomaly detection service.

2. The system of claim 1, further comprising computer-executable instructions to:
   determine an aggregate anomaly value based on at least a subset of the detected anomaly values associated with the request;
   determine the aggregate anomaly value to exceed a threshold aggregate value;
   determine, based at least in part on the aggregate anomaly value exceeding the threshold aggregate value, an anomaly associated with the request; and
   execute a second control action associated with the request, the second control action including one or more of: rejecting the request, modifying an access credential associated with the request, modifying a processing rate associated with the request, providing identification data associated with the request to one or more receiving devices, modifying a route via which the request is provided, or modifying a format associated with the request.

3. The system of claim 1, wherein the security profile data further includes one or more of a request type or a request source, the system further comprising computer-executable instructions to:
   determine, based at least in part on the request, the one or more of the request type and the request source associated with the request; and
   determine correspondence between the security profile data and the one or more of the request type and the request source associated with the request.

4. The system of claim 1, wherein the computer-executable instructions to determine the detected anomaly values associated with the request that deviates from the at least one of the sets of previously generated anomaly values of the security profile data include computer-executable instructions to:
   determine the sets of previously generated anomaly values of the security profile data to be within a threshold tolerance of the detected anomaly values associated with the request; and
   determine a mismatch between the detected anomaly values associated with the request and one or more corresponding anomaly values of the sets of previously generated anomaly values of the security profile data.

5. A method comprising:
   determining detected anomaly values associated with a request received by a plurality of anomaly detection services, the detected anomaly values indicative of confidence that the request is not anomalous;
   determining correspondence between the detected anomaly values and security profile data indicative of sets of corresponding previously generated anomaly values for the plurality of anomaly detection services, wherein the sets of corresponding previously generated anomaly values are indicative of non-anomalous functioning of the plurality of anomaly detection services;

determining, based at least in part on the correspondence between the detected anomaly values and the sets of corresponding previously generated anomaly values of the security profile data, at least one detected anomaly value that deviates from at least one of the sets of corresponding previously generated anomaly values of the security profile data by at least a threshold value;

determining at least one anomaly detection service of the plurality of anomaly detection services associated with the at least one detected anomaly value deviating from the at least one of the sets of corresponding previously generated anomaly values of the security profile data; and performing a control action associated with the at least one anomaly detection service.

6. The method of claim 5, wherein the security profile data further includes one or more of a source or type associated with the sets of corresponding previously generated anomaly values of the securing profile data, the method further comprising:

determining the one or more of the source or the type associated with the detected anomaly values; and determining correspondence between the security profile data and the one or more of the source or the type.

7. The method of claim 5, wherein determining the at least one detected anomaly value that deviates from the at least one of the sets of corresponding previously generated anomaly values of the security profile data includes:

determining a particular set of anomaly values of the at least one of the sets of the corresponding previously generated anomaly values of the security profile data to be within a threshold tolerance of the detected anomaly values; and determining a difference between the at least one detected anomaly value and a corresponding anomaly value of the particular set of anomaly values of the at least one of the sets of the corresponding previously generated anomaly values of the security profile data.

8. The method of claim 5, wherein determining the at least one detected anomaly value that deviates from the at least one of the sets of corresponding previously generated anomaly values of the security profile data includes:

determining a difference between the detected anomaly values and a corresponding anomaly value of a particular set of anomaly values of the at least one of the sets of the corresponding previously generated anomaly values of the security profile data;

disregarding the at least one detected anomaly value of the detected anomaly values to form modified data; and determining correspondence between the modified data and the corresponding anomaly values of the particular set of anomaly values of the at least one of the sets of the corresponding previously generated anomaly values of the security profile data, the correspondence indicating that the difference is associated with the at least one detected anomaly value.

9. The method of claim 5, wherein determining the at least one detected anomaly value that deviates from the at least one of the sets of corresponding previously generated anomaly values of the security profile data includes:

determining a plurality of the sets of the corresponding previously generated anomaly values of the security profile data that include an anomaly value associated with the at least one anomaly detection service; and determining a difference between the at least one detected anomaly value and the anomaly value associated with the at least one anomaly detection service for at least two sets of the plurality of the sets of the corresponding previously generated anomaly values of the security profile data.

10. The method of claim 5, wherein performing the control action includes one or more of:

disregarding one or more subsequent detected anomaly values associated with the at least one anomaly detection service;

modifying at least one input associated with the at least one anomaly detection service;

reducing a weight associated with one or more subsequent detected anomaly values of the at least one service; or generating a report indicative of an anomaly associated with the at least one anomaly detection service.

11. The method of claim 5, further comprising:

determining an aggregate anomaly value based on at least a subset of the detected anomaly values; and based at least in part on the aggregate anomaly value, performing a second control action including one or more of: rejecting a request associated with the detected anomaly values, modifying an access credential associated with the detected anomaly values, modifying a processing rate associated with the detected anomaly values, or providing identification data associated with the detected anomaly values to one or more receiving devices.

12. The method of claim 5, further comprising:

determining correspondence between a source associated with the detected anomaly values and anomaly data indicative of sources associated with increased security; and based at least in part on the correspondence between the source and the anomaly data, performing a second control action including one or more of: rejecting a request associated with the detected anomaly values, modifying an access credential associated with the detected anomaly values, modifying a processing rate associated with the detected anomaly values, or providing identification data associated with the detected anomaly values to one or more receiving devices.

13. The method of claim 5, further comprising:

generating one or more of an alarm or a report indicative of the at least one anomaly detection service;

receiving an indication confirming the at least one detected anomaly value of the at least one anomaly detection service; and modifying the security profile data to include the at least one detected anomaly value in at least one of the sets of the corresponding previously generated anomaly values.

14. The method of claim 5, further comprising:

receiving an indication of a modification associated with the at least one anomaly detection service; and wherein based on the indication of the modification, the control action includes modifying the security profile data to include the at least one detected anomaly value in the at least one of the sets of the corresponding previously generated anomaly values.

15. A system comprising:

one or more memories storing computer-executable instructions; and one or more hardware processors configured to execute the computer-executable instructions to:

provide a plurality of anomaly detection services;

receiving a request at the plurality of anomaly detection services;

generate, by the plurality of anomaly detection services, detected anomaly values associated with the request, the detected anomaly values indicative of confidence that the request is not anomalous;

determine an aggregate anomaly value based on at least a subset of detected anomaly values;

determine correspondence between the aggregate anomaly value and a threshold value that is based on sets of corresponding previously generated anomaly values accessed from security profile data associated with the plurality of anomaly detection services, the threshold value indicative of non-anomalous functioning of the plurality of anomaly detection services; and based on the correspondence between the aggregate anomaly value and the threshold value, perform a control action associated with the request.

16. The system of claim 15, wherein the request is received via one or more networks and the plurality of anomaly detection services are associated with a plurality of levels of a network stack of the network.

17. The system of claim 15, further comprising computer-executable instructions to determine one or more particular anomaly values of the detected anomaly values to be less than one or more second threshold values indicative of an anomaly.

18. The system of claim 15, wherein the control action includes one or more of:

rejecting the request;

modifying an access credential associated with the request;

modifying a processing rate associated with the request;

providing identification data associated with the request to one or more receiving devices;

modifying a route via which the request is provided; or modifying a format associated with the request.

19. The system of claim 15, further comprising computer-executable instructions to:

generate anomaly data based on the at least a subset of the detected anomaly values;

determine correspondence between the anomaly data and anomaly values associated with a second request including the at least a subset of the detected anomaly values; and based on the correspondence between the anomaly data and the anomaly values associated with the second request perform a second control action.

20. The system of claim 15, further comprising computer-executable instructions to:

determine correspondence between the detected anomaly values and security profile data indicative of the sets of corresponding previously generated anomaly values for the plurality of anomaly detection services;

determine, based at least in part on the correspondence between the detected anomaly values and the security profile data indicative of the sets of the corresponding previously generated anomaly values, at least one detected anomaly value that deviates from the sets of the corresponding previously generated anomaly values of the security profile data by at least a threshold value;

determine at least one anomaly detection service of the plurality of anomaly detection services associated with the at least one detected anomaly value; and perform a second control action associated with the at least one anomaly detection service, the second control action including modifying a weight associated with the at least one anomaly detection service for determining the aggregate anomaly value.

* * * * *

UNITED STATES PATENT AND TRADEMARK OFFICE
CERTIFICATE OF CORRECTION

PATENT NO. : 10,158,658 B1
APPLICATION NO. : 14/960013
DATED : December 18, 2018
INVENTOR(S) : Sharifi Mehr Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 170 days.

Signed and Sealed this
Eighteenth Day of June, 2019

Andrei Iancu
*Director of the United States Patent and Trademark Office*